Figure 1:
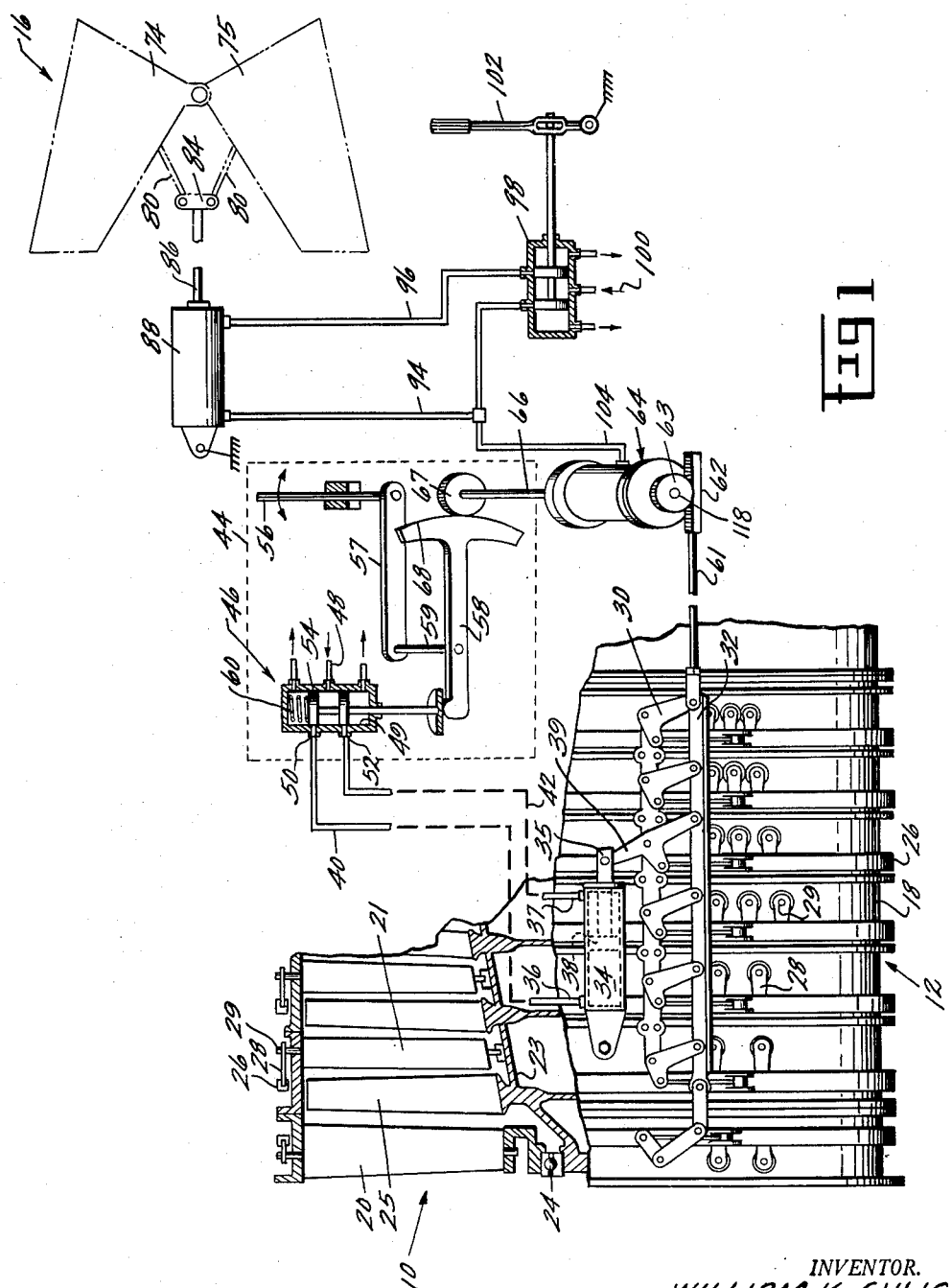

INVENTOR.
WILLIAM K. GULICK
BY
Gerald L Moore
ATTORNEY

United States Patent Office 3,146,585
Patented Sept. 1, 1964

3,146,585
TURBOJET CONTROL SYSTEM FOR PREVENTING COMPRESSOR STALL DUE TO INLET AIR DISTURBANCES
William K. Gulick, Glendale, Ohio, assignor to General Electric Company, a corporation of New York
Filed Sept. 29, 1961, Ser. No. 141,893
3 Claims. (Cl. 60—35.54)

The present invention relates generally to control systems for turbojet engines and more particularly to control systems for turbojet engines of the type which utilize compressors with variable elements such as variable stators for effecting controlled adjustment of compressor geometry and operating characteristics so as to avoid compressor stall under all normal operating conditions of the engine. In accordance with the invention, such compressor variable geometry control is supplemented by additional control means operative to improve compressor stall avoidance capability in applications wherein the engine is subjected to abnormalities in operating conditions occasioned by use of engine thrust reversers, aircraft armament and like auxiliary equipment.

To obtain the high flow, high pressure ratio characteristics desired of the multi-stage axial flow air compressors utilized in current high performance turbojet engines, it is necessary that such compressors be operated rather close to their stall lines and that steps be taken to avoid the possibility that pressure ratios across the individual stages of compressor blading become so high that their normal airflow patterns break down resulting in random and reverse flow of air within the compressor which in turn may result in excessive vibration and engine overtemperatures unless corrected. Several alternative approaches are known to help alleviate the stall problem, among these being the controlled bleed of air from adjacent the compressor discharge section to reduce the pressure ratio across the compressor, the use of two or more separately driven compressor rotor sections enabling independent speed adjustment of compressor rotor stages to better accommodate air flow patterns in those stages, and the use of variable geometry in the compressor with the variable elements in practice normally being the compressor inlet guide vanes and some or all of the stages of the compressor stator blading.

The present invention has particular applicability to turbojet engines incorporating compressors of this latter type, i.e., those incorporating variable geometry compressors. In engines of this type, certain of the compressor stator blades usually including the inlet guide vanes and one or more stages of the stator blading downstream therefore made adjustable and controlled in response to engine operating parameters indicative of compressor stall susceptibility, in a manner to avoid compressor stall during all normal operation of the engine. In some aircraft installations, however, auxiliary equipment used in association with the engine may subject it to unusual operating conditions with such severity that the normal control of the compressor variable geometry may be unable to entirely avoid the possibility of compressor stall. In other words, operation of the normal control system for the compressor variable geometry assumes undisturbed air flow to the compressor intake, and if this air flow pattern is severely disrupted by operation of aircraft auxiliary equipment, the normal control system then may be unable to so schedule the control of compressor variable geometry as to wholly obviate the possibility of compressor stall.

One such item of auxiliary equipment is the engine thrust reverser, which during reverse thrust operation diverts the engine exhaust gas stream forwardly toward the engine air intake. Under some conditions of aircraft operation substantial quantities of this forwardly flowing engine exhaust gas may actually reach the engine air intake and be reingested into the engine, thus causing a very rapid rise in temperature of the air entering the engine as well as changes in the pressure and temperature distribution over the engine intake. These inlet air disturbances may occur so rapidly and be of such magnitude that the variable geometry control system cannot adequately compensate for them by adjustment of the compressor variable geometry, and the compressor accordingly may stall.

Similar problems may arise where cannon, rockets and other aircraft armament are disposed closely adjacent the engine air intake, so that the pressure and temperature fluctuations occasioned by their firing disrupt the normal pressure and temperature patterns adjacent the engine air intake causing inlet air disturbances of magnitude such that the normal control system cannot adequately compensate for them by adjustment of the compressor variable geometry.

Fortunately, the range of adjustment of compressor operating characteristics afforded by variable geometry is sufficiently wide to enable avoidance of compressor stall even during the unusually adverse operating conditions just described, provided the variable stator schedule is modified to compensate for these conditions simultaneously with their occurrence. In accordance with the invention, the capability to accommodate abnormal operating conditions as just described is afforded by use of an additional control input to the variable geometry control operative to modify the normal control schedule upon energization of the auxiliary equipment, whether it be an engine thrust reverser, aircraft armament or other equipment item the operation of which may cause compressor inlet air disturbances.

It is therefore one object of this invention to provide a means for regulating the controls for a variable geometry turbine engine to minimize the effects of disturbances of the inlet air of the engine.

It is another object of this invention to provide a simplified feedback control which integrates a signal from the variable geometry compressor and the source of disturbance of the engine inlet air to control the positioning of the variable geometry of the compressor and thereby limit the effect of this disturbance on engine operation.

Briefly stated, and in accordance with one aspect of this invention, a mechanical control is provided for adjusting the variable geometry of an axial flow compressor in response to a signal for actuation of a mechanism on the aircraft such as the thrust reverser which might cause inlet air disturbance. The control comprises a mechanism for integrating into the position feedback circuit of the variable geometry compressor a signal corresponding to the actuation of the inlet air disturbance causing mechanism wherein the control for the variable geometry compressor is caused to actuate the variable geometry to lessen the possibilities of compressor stall. The mechanism of the feedback circuit consists of a coupling means to signal the variable geometry control and position the variable geometry and in addition introduce an additional signal corresponding to the actuation of the disturbance causing means which changes the feedback signal sufficiently to cause the variable geometry control to reposition the variable geometry and thereby lessen the possibilities of compressor stall.

Figure 2:
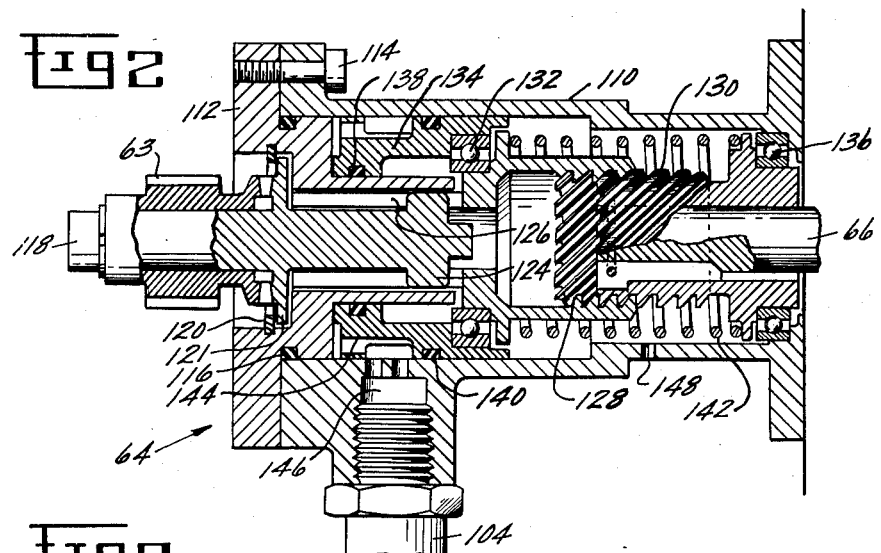
Figure 3:
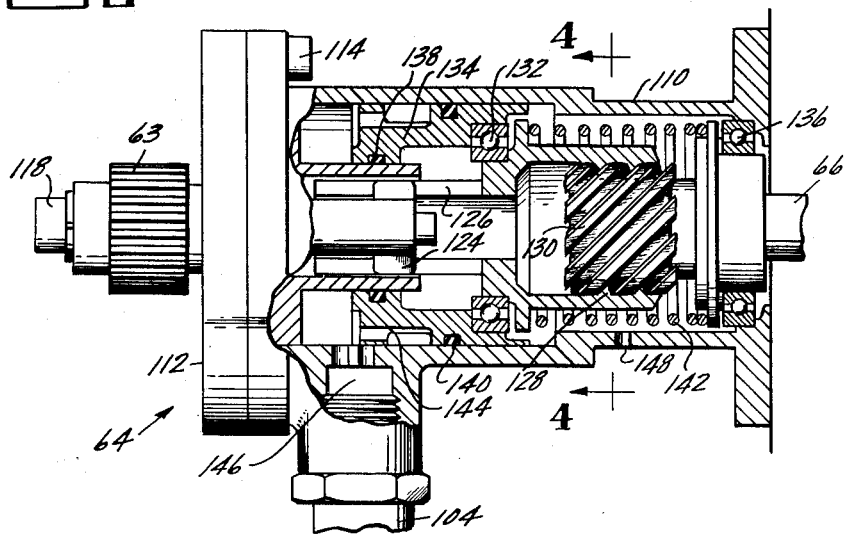
Figure 4:
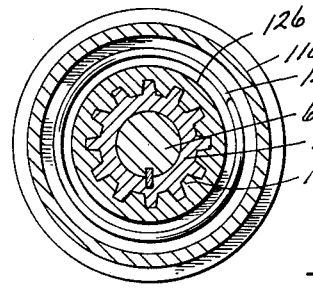

Other objects and many of the attendant advantages of this invention will be readily appreciated as the same becomes better understood by the reference to the following detailed description when considered in connection with the accompanying drawings wherein:

FIGURE 1 is a schematic layout of a compressor variable geometry control system and thrust reverser control system employing the present invention, FIGURE 2 is a sectional view of the integrating coupling of the subject invention, FIGURE 3 is another partial sectional view of the integrating coupling apparatus, and FIGURE 4 is a cross-sectional view along the lines 4—4 of FIGURE 3.

Referring first to FIGURE 1, there is shown the forward end portion of a conventional jet engine comprising a forwardly facing air intake or inlet 10 followed by a compressor section 12. The aft end portion of the engine, including the combustor, turbine and exhaust sections thereof, is not illustrated and is not necessary to the understanding of the present invention. The compressor stator assembly is mounted within a casing 18, with the inlet guide vanes 20, stator vanes 21 and the actuating mechanism for the vanes making up the variable geometry of the compressor. The compressor rotor assembly includes a rotor 23 with vanes 25 attached thereto, the rotor being supported by the stator through the bearings 24.

The variable geometry actuating mechanism includes actuator rings 26 for each stage of stator vanes 20 and 21 and a vane lever arm 28 connected between each stator vane and an actuating ring which rotates about an axis pin 29 for rotational positioning of the stator vanes. Bellcranks 30 connect the actuator rings 26 with the actuator rod 32 so that by axial movement of the actuator rod the actuator rings are moved circumferentially to cause rotation of the vane lever arms 28 and the attached stator vanes. A variable stator actuator 34 acting through a connecting rod 35, and a control linkage 39, controls the longitudinal positioning of the actuator rod 32.

The variable stator actuator 34 shown is of hydraulic type with inlets 36 and 37 for carrying hydraulic fluid to actuate the piston 38 within the cylinder thereof. Hydraulic fluid lines 40 and 42 connect the variable geometry actuator 34 with the compressor variable geometry controll 44. The compressor variable geometry control 44 includes a pilot valve 46 with a pressure fluid inlet 48 and valve chamber 49 with pressure fluid outlets 50 and 52 to which are connected the hydraulic fluid lines 40 and 42 to actuator 34. By longitudinal movement of a pilot valve spool 54 either outlet 50 or 52 may be opened so that pressure fluid may flow from inlet 48 through the valve chamber 49 and through the open outlet to the variable stator actuator 34 for actuation of the variable geometry mechanism.

Actuation of the compressor variable geometry control 44 is controlled by a rotating control rod 56 leading from the main engine control for movement of a connecting lever 57 and feedback lever 58 connected to lever 57 by the pin 59 such that by rotation of the control shaft 56, the connecting lever 57 and attached pin 59 are pivoted so as to move the feedback lever 58 up or down with the valve piston 54 following due to the constant pressure of a spring 60 at one end of the casing 46. The rotation of the control shaft 56, which constitutes the input to the variable stator control system, may be effected by the main engine control (not shown) in accordance with a stator position schedule determined by selected engine operating parameters such as engine speed and compressor inlet air temperature. This stator schedule thus established is such as to avoid compressor stall during all normal operation of the engine.

To assure that the compressor stators accurately follow this schedule, the stator servo loop is closed by a position feedback signal compared against the input signal to determine position error, and pilot valve 46 then is responsive to this position error. To effect this a feedback linkage 61 is provided attached to the actuator rod 32 or some suitable moving part of the variable geometry and leads back, through any suitable translatory-to-rotary motion conversion device such as the rack and pinion 62–63 shown, to the input shaft 118 of an integrating coupling device 64, which will be explained in detail later, to cause rotation of the feedback shaft 66. Attached to the feedback shaft 66 is a feedback pinion gear 67 which intermeshes with the sector gear 68 on the feedback lever 58 to effect a rotation of the feedback lever about the pin 59. By rotation of the feedback lever about the pin 59 the position of the piston 54 may be varied in accordance with the positioning of the compressor variable geometry.

To explain the operation of the compressor variable geometry control, assume that a clockwise rotation of the control shaft 56 is effected by the main engine control thereby signaling for a repositioning of the compressor variable geometry. This results in the connecting lever 57 being rotated in a clockwise direction with the pin 59 being moved upward thereby causing the feedback lever 58 and the piston 54 to move upward. As the piston 54 moves upward within the variable stator control the port 50 is opened thereby allowing hydraulic fluid to pass from the inlet port 48, through the piston chamber 49 into the outlet 50, through the connecting line 40 and the inlet 36 into the variable stator actuator 34. As the hydraulic fluid passes through the inlet 36 the piston is forced to the right, the control linkage 39 is pivoted in a clockwise direction and the actuator rod 32 is caused to move to the left thereby moving all of the bellcranks 30 in a clockwise direction and causing a circumferential movement of the actuator rings 26 about the compressor to effect the positioning of the stator vanes 24.

As the actuator rod 32 is moved to the left the feedback linkage 61 acting through the rack 62 and pinion gear 63 to rotate the input shaft 118 will cause a clockwise rotation of the feedback shaft 66 thereby causing counterclockwise movement of the feedback lever 58 through the feedback gears 67 and 68 which allows the control piston 54 to move back down, close the port 50 and cancel the initial control signal. In this manner once the variable geometry of the compressor is properly positioned such that the initial control signal is cancelled out by the feedback signal the compressor variable geometry remains in its newly assumed position until a repositioning signal is received from the main engine control.

On the engine is located a thrust reverser 16 to effect a reversal of the exhaust flow of the engine and thereby brake the aircraft during landing or when otherwise desired. The thrust reverser comprises blocker doors 74 and 75 which when in the normal forward thrust position as illustrated in the drawing allow a free flow of exhaust gases to the rear of the engine to provide a forward thrust on the aircraft. To actuate the reverser doors to the reverse thrust position to deflect the exhaust gases forward the doors are rotated, the door 74 in a clockwise direction and the door 75 in a counterclockwise direction, until they contact at the center of the exhaust nozzle (not shown) and block exhaust gas flow to the rear. By this movement the exhaust flow will be deflected by the blocker doors and caused to flow laterally and forward causing a reverse thrust force on the aircraft.

To actuate the blocker doors in this manner, lever arms 80 are connected to each door with connecting links 84 extending between the lever arms and the thrust reverser actuating rod 86. A thrust reverser actuator 88 includes a piston mechanism within a casing for moving the actuator rod. Hydraulic lines 94 and 96 connect the thrust reverser actuator to a selector valve 98 wherein high pressure fluid is directed through the inlet 100 to either hydraulic line depending upon the positioning of a control lever 102.

In operation, if the pilot valve is actuated wherein high pressure fluid is allowed to flow through the hydraulic line 94, the piston and actuating rod 86 is forced to the right thereby causing an actuation of the lever arm 80 to cause a clockwise rotation of the blocker door 74 while the lever arm 80 causes a counterclockwise rotation of the attached blocker door 75 and therefore an actuation of the thrust reverser to a reverse thrust position.

However, as mentioned before, actuation of the thrust reverser causing a reverse thrust flow of the exhaust results in an engine inlet air disturbance which may adversely affect engine operation by causing compressor stall. It is therefore desirous to provide for programming the compressor variable geometry to avoid this result. That is one important purpose of this invention, however, it should be remembered that this invention is equally applicable to minimize the effects of disturbance of inlet air by other sources as the firing of guns as mentioned heretofore.

Referring still to FIGURE 1, there is provided a hydraulic fluid conduit 104 leading from the hydraulic line 94 to the integrating coupling 64. The purpose of this connection is to signal the integrating coupling 64 of the actuation of the thrust reverser and thereby cause a compensating adjustment of the compressor variable geometry control 44 to limit the effects of the resulting inlet air disturbance on the engine operation as will be explained in more detail hereinafter.

Referring now to FIGURES 2 and 3, there is illustrated in more detail the coupling 64 which integrates the feedback signal from the compressor variable geometry and a signal responsive to the actuation of the cause of the inlet air disturbance to minimize the effects on the operation of the turbine engine.

The coupling 64 consists of a housing 110 with a removable end plate 112 attached by a suitable means such as a bolt fastener 114. The end plate may be suitably sealed as by seal 116 to prevent hydraulic fluid from leaking from around the end plate of the coupling. An input shaft 118 extends into one end of the coupling and is maintained in place by a spring washer 120 fitting into the end plate 112 of the housing and resting against the shoulder 121 on the shaft. The pinion gear 63 is attached to the input shaft which coacts with the rack gear of FIGURE 1 leading from the compressor variable geometry mechanism. A key member 124 is attached to the inner end of the shaft 118 and forms a splined coupling with the splined shaft 126. The splined shaft 126 is in turn formed integral with a female worm gear member 128 extending on through the housing and mating with a male worm gear 130 which is in turn attached to the feedback shaft 66.

It may be seen that a direct drive connection is formed through the coupling 64 in that by the feedback linkage 61 turning the pinion gear 63 the input shaft 118 is rotated along with the key member 124 which in turn rotates the spline shaft 126 and the female worm gear member 128 thereby rotating the male worm gear member 130 and the feedback shaft 66. The female worm gear member 128 is supported by bearings 132 fitting between this member and slide member 134. Similarly, the feedback shaft 66 and male worm gear member 130 are supported in the housing by the bearing 136 fitting between this member and the housing 110.

The slide member 134 fits between the housing 110, the end plate 112 and the female worm gear member 128 through bearing 132 with seals 138 and 140 sealing the pressure cavity 144 formed by the slide member, the housing 110 and the end plate 112.

By axial movement of the slide member 134, the female worm gear member 128 may be moved axially against the action of a spring 142 fitting between this member and the male worm gear member 130 to a position illustrated in FIGURE 3. Under normal conditions the member 128 and slide member 134 rest in the furthermost position to the left in the drawing under the force of spring 142.

Connected to the pressure chamber 144 is an inlet 146 to which the hydraulic fluid conduit 104 is attached. By introducing pressure fluid through the hydraulic fluid conduit 104 the slide member 134 is forced to the right which in turn forces the female worm gear member 128 in the same direction. The axial movement of the female worm gear member with respect to the input shaft 118 is permitted by the splined coupling comprising the spline shaft 126 interacting with the keyed shaft 124. However, movement of the female worm gear member 128 to the right causes a rotation of the male worm gear member 130 and subsequently the feedback shaft 66. A drain port 148 allows for the escape of any pressure fluid which might pass by the seal 140.

The coupling operation therefore consists of directly transmitting a rotational motion introduced through the rack gear 62 and coacting pinion gear 63 on the input shaft 118 through the splined shaft 126, the female worm gear member 128 and the male worm gear member 130 to directly rotate the feedback shaft 66 in a one-one ratio. Also, a phase relationship change between input shaft 118 and feedback shaft 66 may be affected by the introduction of pressure fluid into the pressure chamber 144 causing the slide member 134 and the female worm gear member 128 to move to the right thereby causing a rotation of the male worm gear 130 and introducing a rotational motion to the feedback shaft 66. The coupling 64 in this manner integrates rotational and sliding movements or signals to the feedback shaft 66.

Referring now back to FIGURE 1 in explaining the operation of the overall system, it can be seen that as explained heretofore the compressor variable geometry control system works in the normal manner and an additional control signal input may be introduced through the coupling 64 which is responsive to the actuation of an accessory which might cause inlet air disturbance such as the thrust reverser actuation. When the thrust reverser is actuated, pressured hydraulic fluid passes through the fluid conduit 94 down to the thrust reverser actuating mechanism 88 to actuate the thrust reverser; however, at the same time, the pressured fluid passes through the conduit 104 to the coupling device 64.

This pressured fluid causes a movement of the slide member 134 and the female worm gear member 128 to cause a rotation of the feedback shaft 66 as explained heretofore. The rotation of the feedback shaft 66 and the gear member 67 causes the feedback lever 58 to pivot counterclockwise allowing the piston 54 to move down thereby opening the outlet 52. Pressured hydraulic fluid passes from the inlet 48 through the piston chamber 49 and through the outlet 52 to the conduit 42 and the inlet 37 of the variable geometry control mechanism 34. This moves the piston 38 to the left rotating the control linkage 39 in a counterclockwise direction moving the actuator rod 32 to the right which rotates the actuater rings downward thereby repositioning in a closing direction the variable stator vanes 21. The movement of the actuator rod 32 causes a similar movement of the feedback linkage 61 which moves the rack gear 62 and rotates the pinion gear 63 counterclockwise on the coupling 64 in the direction such that the rotation of the spline shaft 126 and the female worm gear member 128 rotates the male worm gear member 130 and restores the system to a steady state condition.

By integrating the control from any inlet air disturbance causing mechanism, such as a thrust reverser mechanism or armament on the aircraft, with the variable geometry control system a signal corresponding to this disturbance causing actuation causes the variable geometry control system to reposition the variable geometry to close the variable stator vanes on the compressor and decrease the possibilities of compressor stall and allow for continuous efficient operation of the engine. This is accomplished through a positive actuating means.

Where a particular embodiment of the invention has been illustrated and described, it will be obvious to those skilled in the art that various changes and modifications may be made without departing from the invention. It is therefore intended to cover in the appended claims all

What I claim as new and desire as secured by Letters Patent of the United States is:

1. For a jet engine having a compressor with variable compressor members for varying the compressor geometry and a thrust reverser mechanism, actuator means for adjusting said variable compressor members,
   control means including first and second control members and providing an output signal to said actuator means responsive to position of said control members,
   a feedback circuit connecting said compressor and said control means for providing a first control input responsive to the compressor geometry to said control means,
   said feedback circuit being interrupted to include a coupling device whereby said first control input may be changed by a second control input,
   a second circuit connecting said coupling device with said thrust reverser mechanism to change said second control input responsive to the position of said thrust reverser thereby causing said control means to correlate the compressor geometry with the position of the thrust reverser mechanism to lessen the effects of disturbance of the engine inlet air stream during thrust reverser operation.

2. For a jet engine having a compressor with variable compressor members for varying the compressor geometry and a thrust reverser mechanism,
   a control means for controlling said variable geometry compressor,
   a rotating connector attached to said variable compressor members to indicate by its rotary position the geometry of said compressor,
   a coupling means having an input and output shaft,
   said coupling means having said connector attached to said input shaft and the output shaft connected to transmit rotary motion to said control means,
   said input and output shafts connected for direct drive through a coupling element,
   said coupling element connected to said input shaft to permit axial movement therebetween,
   said coupling element connected to said output shaft such that axial movement of said coupling element causes rotation of said output shaft,
   axial actuating means for said coupling element responsive to the position of said thrust reverser mechanism,
   whereby said compressor geometry indication signal transmitted back to said compressor control is changed by thrust reverser actuation to cause said compressor control to regulate said compressor geometry to reduce the effect of engine inlet air distortion on the compressor.

3. For a jet engine having a compressor with variable compressor members for varying the compressor geometry and a thrust reverser mechanism, a control means for controlling the compressor geometry responsive to first and second control signals.
   a feedback circuit connecting said compressor and said control means for signalling a first control input corresponding to the compressor geometry,
   said feedback circuit being interrupted to include a coupling means whereby said first control input may be changed by a second control input,
   a second circuit connecting said coupling means with said thrust reverser mechanism to change said second control input responsive to the position of said thrust reverser thereby causing said control means to correlate the compressor geometry with the position of the thrust reverser mechanism to lessen the effects of disturbance of the engine inlet air stream during thrust reverser operation.

References Cited in the file of this patent

UNITED STATES PATENTS

| | | |
|---|---|---|
| 2,932,164 | Watson | Apr. 12, 1960 |
| 2,932,206 | Tootle | Apr. 12, 1960 |
| 2,945,347 | Colley | July 19, 1960 |
| 2,945,387 | Geyer | July 19, 1960 |